1,721,832

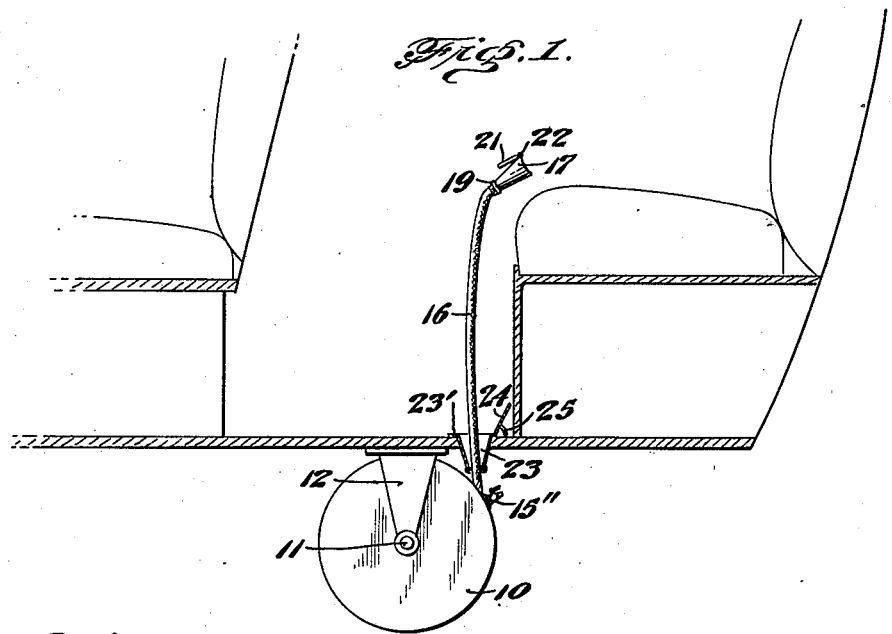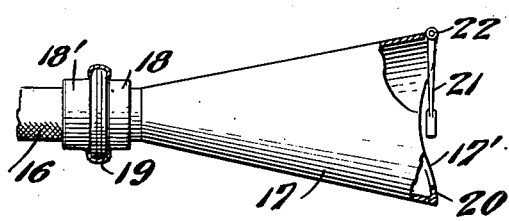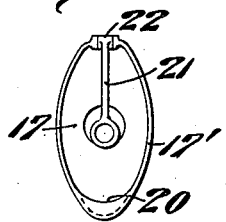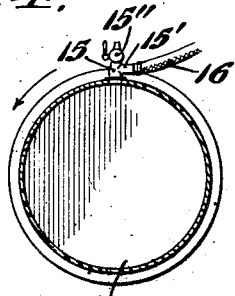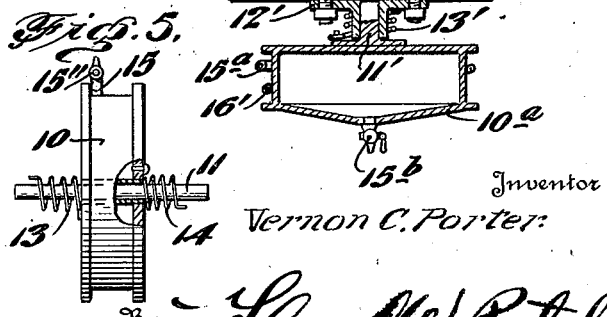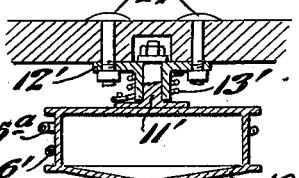
Inventor
Vernon C. Porter
By Lloyd W. Patch
Attorney July 23, 1929.   V. C. PORTER   1,721,832
ATTACHMENT FOR AUTOMOBILES AND THE LIKE
Filed July 31, 1925   2 Sheets-Sheet 2
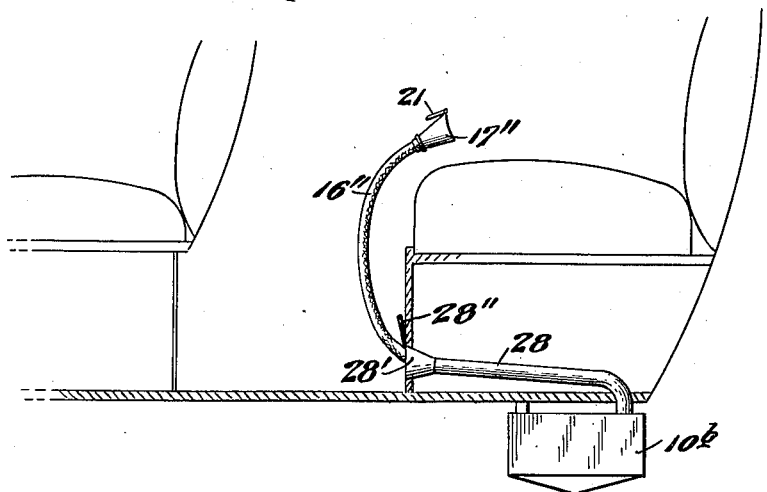
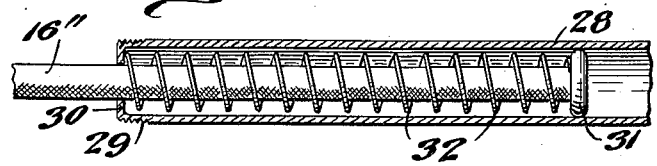
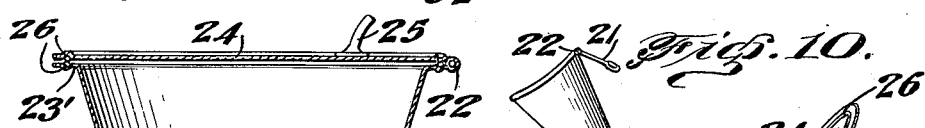
Inventor
Vernon C. Porter
By Lloyd W. Butch
Attorney Patented July 23, 1929.

UNITED STATES PATENT OFFICE.

VERNON C. PORTER, OF NEW YORK, N. Y., ASSIGNOR TO GEORGE N. RANDLE, OF OAKLAND, CALIFORNIA.

ATTACHMENT FOR AUTOMOBILES AND THE LIKE.

Application filed July 31, 1925. Serial No. 47,289.

This invention appertains to improvements in personal comfort or toilet apparatus generally, and has for its principal object to provide for a type of such apparatus adapted for attachment to automobiles and the like, and in a manner to be used either when the latter are in motion or at rest.

Another object of the invention is to provide for a urinal type of toilet apparatus, and one capable of being easily and readily mounted on any and all standard or special makes of automobiles or other forms of vehicles, and so arranged as to be normally hidden from view but at all times in a position for instant use.

A further object of the invention is to provide for an apparatus of the kind set forth, and one which will be available for comparatively inconspicuous use by any one of several persons, male or female, occupying a seat within the body of a vehicle on which the apparatus is mounted.

Another object of the invention is to provide for an apparatus of the class described, and one capable of being mounted on a vehicle, whereby to be available for use by persons occupying either the front or the rear seats, or both, thereof.

A further object of the invention is to provide for an apparatus of the type hereinbefore mentioned, and one which will have the receiving receptacle so mounted upon the vehicle as to be in a position for the ready emptying of its contents without the necessity of removing the same from the vehicle for such purpose.

A still further object of the invention is to provide for an apparatus of the character set forth, and one of an extremely simple construction and arrangement, such as will be inexpensive to manufacture and install, easily to manipulate to and from positions of use, and otherwise highly efficient in operation.

With the foregoing and other equally important objects in view, the invention resides in the certain novel and useful construction, arrangement and operation of parts as will be hereinafter more fully described, set forth in the appended claims, and illustrated in the accompanying drawings, in which:—

Figure 1 is a fragmentary vertical longitudinal section through the body of a vehicle, and showing a preferred embodiment of the invention as applied thereto, Figure 2 is an enlarged side elevation, partly in section, of the intake end of the apparatus, Figure 3 is a front elevation of the part shown in Figure 2, Figure 4 is a sectional view through the receiving receptacle or drum portion of the apparatus, Figure 5 is a front elevation of the said receptacle or drum, Figure 6 is a modified form of the apparatus and the mounting for the same, Figure 7 is a view, similar to that of Figure 1, showing a further modification of the invention as installed in position on a vehicle, Figure 8 is a sectional view through the slip joint connection of the flexible intake or conduit employed in the latter form of apparatus, Figure 9 is a vertical section through a casing to be used for housing the intake end of all forms of the flexible conduit or hose leading to the receiving receptacles, Figure 10 is a diagrammatical assembly, partly in section, of the preferred form of the apparatus as it appears in position of use, and, Figure 11 is a fragmentary sectional view of a vehicle showing a still further modification of the invention.

Referring to the drawings, and more particularly to Figures 1, 4, 5 and 10, wherein is shown the preferred form of the invention, the numeral 10 indicates a receiving receptacle, preferably in the form of a hollow cylindrical body or drum, which is mounted for rotary movement on a shaft 11 supported in suitable hangers or brackets 12 from the under side or floor of a vehicle. Mounted on the opposite ends of the shaft 11, between the sides of the drum 10 and the hangers 12, are coiled springs 13 and 14, which have one of their ends secured to the adjacent sides of the said drum and their other ends to the adjacent of the said hangers, whereby the same will be placed under tension during one directional movement of rotation of the drum and will act on the latter to return it to normally inoperative position, when the drum is released for the purpose. Opening into the cylinder or drum 10, through the peripheral wall 10' thereof, is a combined inlet and outlet nipple 15, which is provided with a laterally offset inlet portion 15' for the attachment thereto of a flexible conduit or hose 16, and a valved outlet portion 15″ for the discharge therethrough of the contents of the cylinder or drum, when desired or necessary. The hose 16 is of a suitable length to be normally wound around the drum 10 one or more times, and has its free end passed upwardly through an opening in the floor of the vehicle and provided with a suitable basin 17.

As shown, particularly in Figures 2 and 3, the basin 17 is tapered inwardly from its larger end 17′, and, at its smaller end, is provided with a beaded portion 18 to be abutted against a similarly beaded portion 18′ secured on the free end of the hose 16, whereby the abutted beads may be engaged by a clamping ring 19. The basin opening is preferably of a substantially elliptical or oval form whereby to be adapted for application to the urinary organs of either the male or female of the human species, and has a lip 20 formed inwardly of its lower side to prevent drippage of urine therefrom. To facilitate the sanitary handling of the basin 17, a handle 21 is provided for the purpose, and the same is hingedly attached, as at 22, to the upper side of the portion 17′ directly opposite to the position of the lip portion 20. This handle 21 is arranged to swing inwardly of the opening of the basin 17, when not in use.

As shown in Figures 1, 7, 9 and 10, a suitable conduit casing 23 is provided for the housing of the basin 17, when the same is not in use. This casing or fixed conduit is fitted into the opening in the floor or other part of the vehicle, through which the conduit or hose 16 is passed to the interior of the body of the vehicle. This casing 23 is of approximately the same shape as the basin 17, but slightly larger, and is provided at its upper larger end with an outturned flange 23′ whereby to be properly supported and secured in position. Hinged at one side of the larger or flanged end of the casing 23, is a cover portion 24 normally closing the same so as to effectively hide the mouth-piece 17 positioned within the casing, and to prevent any odors from being discharged into the interior of the vehicle body. Projecting from the outer or upper side of the cover 23 is a finger piece 25, by means of which the cover 24 is opened and closed, and, in the open position of the latter, the finger piece 25 acts as a supporting leg for maintaining the cover in such position during the use of the apparatus. The flange 23′ and the overlying peripheral edge portion of the cover 24 are preferably formed with opposed registering channels for the reception therein of a suitable packing 26, whereby to further prevent the escape of odors from the basin 17, when the same is enclosed within the casing 23.

With the apparatus mounted on a vehicle substantially as shown, the hose 16 is normally wound on the drum 10 by the retractive action of the coiled springs 13 and 14, and the basin 17 enclosed within the casing 23, a person, occupying the seat of the vehicle with which the apparatus is associated and desiring to make use of the latter, will first raise the cover 24 of the casing 23 to fully open position, and then grasp the handle 21 of the basin 17 and pull upwardly on the same to unwind the hose 16 from the drum 10 sufficiently to permit the basin 17 to be disposed in a comfortably operative position. After use, the hose 16 will be drawn downwardly through the casing 23 and again wound on the drum 10, by the action of the coiled springs 13 and 14, which were placed under tension by the unwinding action of the hose 16, and until the basin 17 seats within the casing 23. By now moving the cover 24 to closed position, the basin 17 will be hidden from view, and any odors tending to pass therefrom will be prevented from being discharged into the body of the vehicle. When desired or necessary, the receptacle or drum 10 may be emptied by manipulating the pet-cock 15″ to open position, the drum 10 being given a partial turn to bring the latter to its lowest position of operation, if the same is not normally disposed in such position when the apparatus is inoperative.

In Figure 6, there is shown a slightly modified form of drum or receptacle and a mounting therefor, and, as shown, the drum body $10^a$ is horizontally disposed by having a spindle 11′ projected from its upper side wall and journalled in a bearing member 12′ secured to the under side of the flooring of the body of the vehicle by means of the bolts or other similar fastenings 27. Surrounding the bearing 12′ is a coiled spring 13′ having one of its ends secured to the latter and the other end to the drum $10^a$, so that in its normal position of operation, a hose 16′ will be maintained in wound condition around the peripheral wall of the drum. An inlet nipple $15^a$ will be provided for the attaching thereto of one end of the hose 16′ at a point on the peripheral wall of the drum 10′ and adjacent the upper side of the latter, substantially as shown. In this case, the lower wall of the drum 10′ is preferably dished in a downward direction and is provided with a valved outlet $15^b$, all in a manner to effectively drain the contents from the drum $10^a$, whenever the valve of the outlet is manipulated to open position. The hose 16′ will be provided with a basin 17 to be housed in a conduit casing 23, whereby the apparatus, in its entirety, will be operable in the same manner as in the first instance of the invention.

In Figure 7, there is shown a more simple and inexpensive form of the invention, and, in this instance, a stationary type of receptacle $10^b$ is mounted in any suitable manner on the under side of the floor of a vehicle, and has its lower wall preferably dished in a downward direction to facilitate the draining of the contents of the receptacle through a petcock 15ᶜ opening outwardly of the lowest point of the said wall. Opening into the upper wall of the receptacle is one end of a rigid tubing or conduit 28 which is passed upwardly through the floor of the vehicle at a point preferably beneath one of the seats within the body of the latter and then bent in a manner to be extended in a forward direction to the wall of the seat supporting frame. The end of this extended portion of the tubing or conduit 28 is flared, as at 28′, and opens through the front wall of the seat frame, substantially as shown. A length of flexible tubing or hose 16″ has one end passed inwardly of the flared end of the conduit 28, and its other end provided with a basin 17′, which, when not in use, is to be housed within the flared end 28′, a cover 28″ being provided to close the latter after the basin has been disposed therein. As shown in Figure 8, the free end of the slanted portion of the conduit 28 may be screw-threaded, as at 29, to receive thereon this end flared portion 28′, and, in this case, this end of the same will be inturned, as at 30, to provide a flange adapted to prevent the disengagement of the inserted end of the flexible tubing or hose 16″ therefrom, the latter being provided with an enlargement 31 for the purpose of abutting the flange 30, when the tubing or hose is drawn outwardly of the conduit 28 to its operative position. To facilitate the movement of the flexible conduit or hose 16″ inwardly of the conduit 28, after its use, a coiled spring 32 is engaged over the tubing or hose 16″ and is positioned thereon with one end disposed in abutting relation to the enlargement 31 and its other end in similar relation to the flange 30, whereby, upon the release of the hose, it will expand and draw the latter into the conduit 28 and until the basin 17″ is seated within the flared end portion 28′, the spring 32 being placed under compression on the outward movement of the tubing or hose to operative position.

In Figure 11, the modified form of the invention as shown therein, comprises a stationary receptacle 10ᵇ and a pet-cock 15ᵈ, constructed and arranged after the manner of the receptacle 10ᵃ and pet-cock 15ᶜ, of the form of the invention as shown in Figure 7. In this instance, a suitable length of rigid conduit is employed in lieu of the flexible hose, and is bent to provide angularly disposed portions 16ᵃ and 16ᵇ, the free end of the portion 16ᵃ being pivotally connected to the receptacle 10ᵇ and in a manner to open into the same adjacent its upper side, while the free end of the portion 16ᵇ is provided with an intake basin 17ᵃ. In the use of this form of apparatus, the receptacle 10ᵇ is supported in position at the under side of the floor of the body of a vehicle, and in a manner that the rigid conduit can be swung vertically from its normally inoperative position beneath the vehicle floor to an operative position within the body of the vehicle, a suitable slotted opening being provided in the floor for the purpose and substantially as shown.

While the apparatus has been described and illustrated herein in specific terms and details of the construction, arrangements and operation of several forms thereof, various other changes in and modifications of the same may be resorted to without departing from the spirit of the invention, or the scope of the claims appended hereto.

Having thus fully described the invention, what is claimed, is:—

1. A device of the character described comprising a basin adapted to be removably positioned in an aperture in an automobile, a fixed discharge conduit, a flexible discharge tube connected with said basin extending into said conduit and slidable therein, and resilient means acting upon said tube for returning the same into said conduit when it is withdrawn therefrom.

2. A device of the character described comprising a basin removably positioned in an aperture in the body of the automobile, a fixed discharge conduit underneath said body, and a flexible discharge means connected with said basin extending into said conduit and slidable therein.

3. A device of the character described comprising a basin removably positioned in an aperture in the body of the automobile, a fixed discharge conduit underneath said body, a flexible discharge tube connected with said basin extending into said conduit and slidable therein, and resilient means acting upon said tube for returning the same into said conduit when it is withdrawn therefrom.

4. A device of the character described comprising a basin removably positioned in an aperture in the body of the automobile, a fixed discharge conduit underneath said body, a flexible discharge tube connected with said basin extending into said conduit and slidable therein and means for returning said tube into said conduit when it is withdrawn therefrom comprising a spring actuated reel positioned adjacent the discharge end of said conduit, and means connecting the discharge end of said tube with said reel.

5. The combination with a vehicle body having an aperture therein of a receptacle adapted to be mounted exteriorly of the body of the vehicle, a flexible conduit in communication with said receptacle and adapted to pass thru said aperture in said vehicle body, and a basin attached to said conduit and adapted to pass to various points within said body.

In testimony whereof I affix my signature.

VERNON C. PORTER.